US005794666A

United States Patent [19]

Yanagawa et al.

[11] Patent Number: 5,794,666

[45] Date of Patent: Aug. 18, 1998

[54] GASEOUS FUEL FILLING STRUCTURE AND FILLING METHOD USING THE SAME

[75] Inventors: Yuji Yanagawa, Nagoya; Keigo Kato, Okazaki; Koichiro Muta, Okazaki; Tadao Ikihara, Okazaki; Tamon Tanaka, Gojo, all of Japan

[73] Assignee: Mitsubishi Jidosha Kogyo Kabushiki Kaisha, Tokyo, Japan

[21] Appl. No.: 724,956

[22] Filed: Oct. 2, 1996

[30] Foreign Application Priority Data

Oct. 2, 1995 [JP] Japan .................................... 7-254989
Oct. 3, 1995 [JP] Japan .................................... 7-256323

[51] Int. Cl.[6] ................................ F17D 1/04; B60S 5/02; F17C 5/06

[52] U.S. Cl. .................................. 141/18; 141/3; 141/44; 137/540; 137/614.2; 137/614.21; 123/527

[58] Field of Search ............................... 141/2–4, 18, 21, 141/44, 45; 123/527–529; 137/540, 614.2, 614.21

[56] References Cited

FOREIGN PATENT DOCUMENTS 0661428 7/1995 European Pat. Off. .

*Primary Examiner*—J. Casimer Jacyna

[57] ABSTRACT

A gaseous fuel filling structure includes a coupler connected to a gaseous fuel supply system, a gaseous fuel cylinder that stores a gaseous fuel at a high pressure, a fuel dissipation preventing device that prevents dissipation of the gaseous fuel, and a switching device that is selectively placed in a first state in which the coupler is connected to the gaseous fuel cylinder and disconnected from the fuel dissipation preventing device, or a second state in which the coupler is connected to the fuel dissipation preventing device. The switching device includes a member(s) for preventing back flow of the gaseous fuel from the gaseous fuel cylinder toward the coupler.

27 Claims, 10 Drawing Sheets

GASEOUS FUEL FILLING STRUCTURE AND FILLING METHOD USING THE SAME

BACKGROUND OF THE INVENTION

The present invention relates to a gaseous fuel filling structure adapted to supply a gaseous fuel to a motor vehicle or the like, through a pair of fill couplers that are connected to each other, and a fuel filling method using such a structure. More specifically, the invention is concerned with a gaseous fuel filling structure suitably used for supplying a gaseous fuel that is undesirable to be discharged or dispersed into the air.

FIG. 11 shows an example of a fuel filling structure which may be used at a gas station for refueling an automobile using a compressed natural gas (CNG) as a fuel.

As shown in FIG. 11, a fuel supply system on the side of the gas station includes a fill nozzle 70 as one of the pair of fill couplers, and a switch valve 74 adapted to open and close a fuel passage 72, while the vehicle includes a fill coupler 76 connected to the fill nozzle 70, two way type valve 78, and a fuel cylinder 80. In FIG. 11, reference numeral 82 denotes a check valve, and 84 denotes an emergency shut-off valve.

To refuel the vehicle, the fill coupler 76 and fill nozzle 70 are initially connected to each other, and the two way valve 78 is then placed in its "REFUEL" position. The switch valve 74 is then opened to deliver the fuel at a pressure of 200 kgf/cm$^2$. Once the fuel cylinder 80 is filled with the fuel, the two way valve 78 is placed in its "DRIVE" position, and the pressure of the fuel is reduced to 7 kgf/cm$^2$. Subsequently, the pressure between the fill coupler 76 and the switch valve 74 is vented to atmosphere, and the fill coupler 76 is disconnected from the fill nozzle 70.

In the fuel supply structure as described above, pressurized natural gas (indicated by hatched areas in FIG. 11 and other figures) remains in the fuel passage W between the switch valve 74 and the two way type valve 78, and such residual gas is discharged into the air when this passage W is vented to atmosphere.

It follows that a harmful substance (i.e., natural gas) is diffused into the air without restriction, to cause air pollution, whereas regulations have been imposed on exhaust gases generated by automobiles for many years in an attempt to solve the problem of air pollution. Thus, the diffusion of the harmful substance, as described above, may detract from such efforts made to solve the air pollution problem.

SUMMARY OF THE INVENTION

It is, therefore, a first object of the present invention to provide a gaseous fuel filling structure that is capable of disposing of a residual gaseous fuel and inhibiting the fuel from being discharged into the air after refueling, thereby contributing to control of air pollution. It is a second object of the present invention to provide a fuel filling method using such a structure.

The first object may be accomplished according to a first aspect of the present invention, which provides a gaseous fuel filling structure comprising: a coupler connected to a gaseous fuel supply system; a gaseous fuel cylinder that stores a gaseous fuel at a high pressure; fuel dissipation preventing means for preventing dissipation of the gaseous fuel; and a switching device that is placed in a selected one of a first state in which the coupler is connected to the gaseous fuel cylinder and disconnected from the fuel dissipation preventing means, and a second state in which the coupler is connected to the fuel dissipation preventing means, the switching device including means for preventing back flow of the gaseous fuel from the gaseous fuel cylinder toward the coupler. In the structure constructed as described above, the switching device may be appropriately switched to allow the gaseous fuel to flow only toward the gaseous fuel cylinder under a high filling pressure during refueling, and allow the fuel to flow toward the fuel dissipation preventing means when the filling pressure is lowered upon completion of refueling to avoid diffusion of the gaseous fuel into the air.

In one preferred form of the present invention, a main passage extends from the coupler to the switching device, and splits into a first gas passage that communicates with the gaseous fuel cylinder, and a second gas passage that communicates with the fuel dissipation preventing means, and the switching device is a valve device disposed at a position where the main passage splits into the first and second gas passages. The valve device has a first switch position in which the main passage is connected to the first gas passage and disconnected from the second gas passage, a second switch position in which the main passage is connected to the second gas passage and disconnected from the first gas passage, and a third switch position in which the main passage is disconnected from both of the first and second gas passages. In this arrangement, diffusion of the gaseous fuel into the air can be prevented by appropriately switching the valve device.

In another preferred form of the invention, a main passage extends from the coupler to the switching device, and splits into a first gas passage that communicates with the gas fuel cylinder, and a second gas passage that communicates with the fuel dissipation preventing means, and the switching device has a first valve device disposed in the first gas passage to selectively open and close the first gas passage, and a second valve device disposed in the second gas passage to selectively open and close the second gas passage. In this arrangement, diffusion of the gaseous fuel into the air can be prevented by appropriately switching the first and second valve devices.

In a further preferred form of the invention, a main passage extends from the coupler to the switching device, and splits into a first gas passage that communicates with the gas fuel cylinder, and a second gas passage that communicates with the fuel dissipation preventing means, and the switching device includes a check valve disposed in the first gas passage to allow the gaseous fuel to flow only toward the gaseous fuel cylinder, and a valve device disposed in the second gas passage to selectively open and close the second gas passage. In this arrangement, diffusion of the gaseous fuel into the air can be prevented by appropriately switching the check valve and the valve device.

In the above three preferred forms of the invention, an excess flow check valve may be provided that is closed when a flow rate of the gaseous fuel in the second gas passage exceeds a predetermined value. With this excess flow check valve provided, even when the switching device is erroneously operated, the gaseous fuel is prevented from flowing into the fuel dissipation preventing means under a high filling pressure, thus protecting the fuel dissipation preventing means.

The above-indicated fuel dissipation preventing means may be a tank or an adsorbent that adsorbs the gaseous fuel. When the adsorbent serves as the fuel dissipating preventing means, the adsorbent may be connected to an intake passage of an internal combustion engine that uses the gaseous fuel.

In this arrangement, the gaseous fuel is adsorbed by the adsorbent, and is thus surely prevented from dissipating into the air. At the same time, the gaseous fuel adsorbed by the adsorbent can be removed due to flow of the intake air, so that the fuel can be burnt in the internal combustion engine, and the adsorbent can be reused.

When the adsorbent serves as the fuel dissipating preventing means, the adsorbent may be provided in an intake passage of an internal combustion engine that uses the gaseous fuel. In this arrangement, the gaseous fuel is adsorbed by the adsorbent, and thus surely prevented from dissipating into the air. At the same time, the gaseous fuel adsorbed by the adsorbent can be removed due to flow of the intake air, so that the fuel can be burnt in the internal combustion engine, and the adsorbent can be reused. Further, the adsorbent also adsorbs the gaseous fuel remaining in the intake passage while the internal combustion engine is stopped to prevent the fuel from dissipating into the air.

The above object may be accomplished according to a second aspect of the present invention, which provides a gaseous fuel filling method using the gaseous fuel filling structure, as described above, along with the gaseous fuel supply system having a filling coupler connected to the coupler of the filling structure, a gas supply side switch valve disposed upstream of the filling coupler for selectively opening and closing a gas passage formed through the supply system, and supply pressure changing means for supplying the gaseous fuel under a high filling pressure during refueling, and supplying the gaseous fuel under a low post-filling pressure upon completion of refueling. This method includes the steps of: connecting the filling coupler to the coupler of the gaseous fuel filling structure; opening the gas supply side switch valve and placing the switching device in the first state in which the coupler is connected to the gaseous fuel cylinder and disconnected from the fuel dissipation preventing means to supply the gaseous fuel to the gaseous fuel cylinder under the high filling structure; and placing the switching device in the second state in which the coupler is connected to the fuel dissipation preventing means with the high filling pressure being reduced to the low post-filling pressure; and closing the gas supply side switch valve. According to this method, diffusion of the gaseous fuel into the air can be surely prevented.

DETAILED DESCRIPTION OF THE PREFERRED EMBODIMENTS

Referring to FIG. 1 through FIG. 6, there will be described in detail one embodiment of the present invention when applied to an automobile using compressed natural gas as a fuel.

Figure 1:
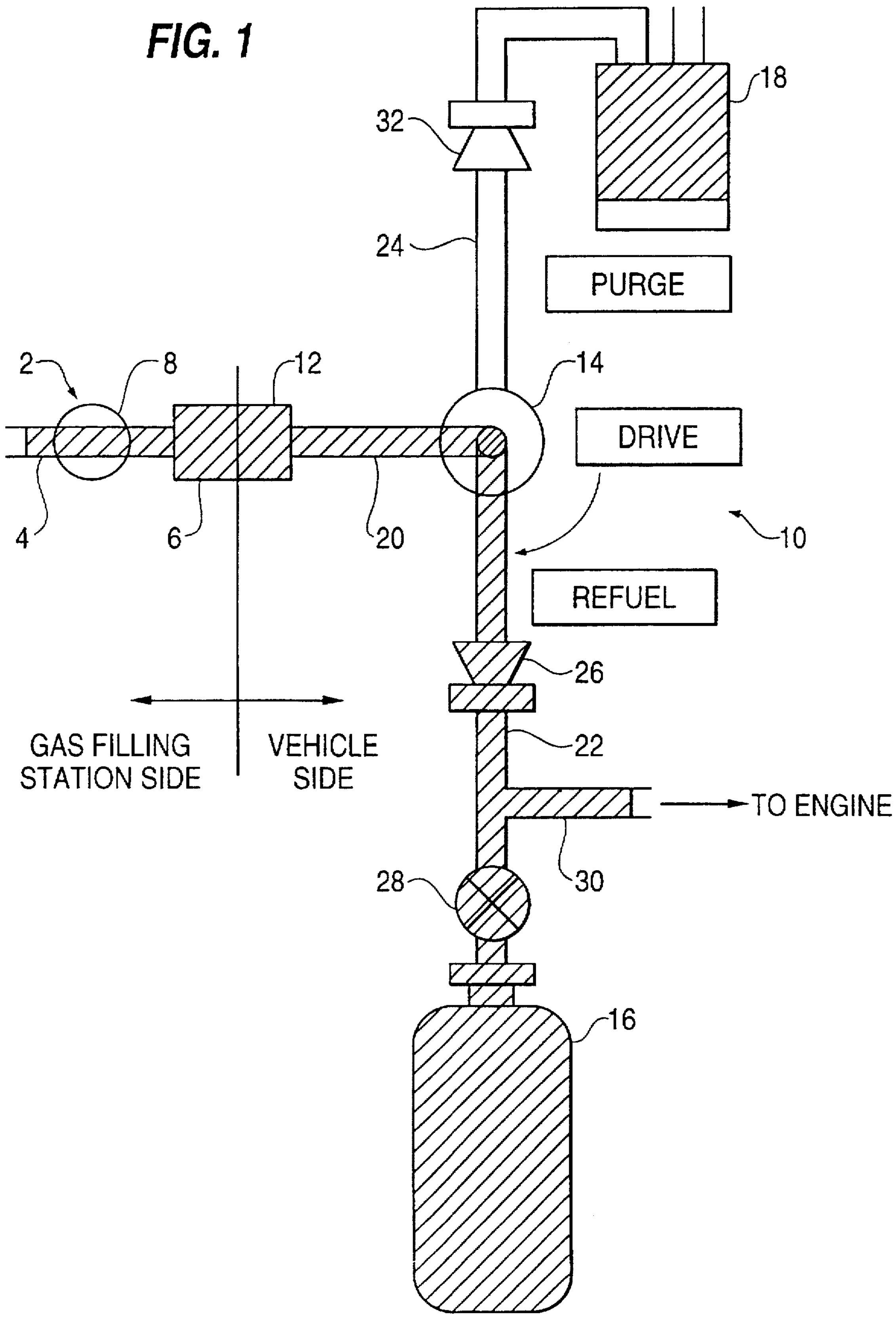
FIG. 1 is a view schematically showing a pressurized gas filling structure as one embodiment of the present invention.

As shown in FIG. 1, a gas supply system 2 (gas filling station) for supplying a gas in the form of compressed natural gas, under variable pressure, includes a gas passage 4, and a fill coupler 6 disposed at the distal end of this gas passage 4, and a gas supply side switch valve 8 disposed upstream of the fill coupler 6 for opening and closing the gas passage 4.

On the other hand, a motor vehicle 10 as a gas receiving system includes a fill coupler 12 connected to the fill coupler 6 on the side of the gas filling station, a three way type valve 14 as a passage switching device, a cylinder 16 as a first tank that stores the gas at a high pressure, and a second tank 18 that stores the gas at a low pressure. The vehicle 10 further includes a main passage 20 communicating the fill coupler 12 with the three way type valve 14, a first gas passage 22 communicating the three way valve 14 with the cylinder 16, and a second gas passage 24 communicating the three way valve 14 with the second tank 18.

The fill coupler 12 may be provided with a check valve (not shown) which allows the gas to flow only in the direction from the gas supply system 2 toward the gas receiving system or vehicle 10. With this check valve provided, the gas in the gas receiving system is prevented from flowing back to the gas supply system, and also prevented from diffusing into the air.

The three way valve 14 is selectively placed in one of three positions, i.e., "REFUEL" position, "PURGE" position, and "DRIVE" position, in accordance with respective steps of refueling operation as described later. The main passage 20 is connected to the first gas passage 22 when the three way valve 14 is placed in the "REFUEL" position, and connected to the second gas passage 24 when the valve 14 is placed in the "PURGE" position. The main passage 20 is connected to neither of the first gas passage 22 and the second gas passage 24 when the three way valve 14 is placed in the "DRIVE" position.

The first gas passage 22 is provided with a check valve 26 that allows flow of the gas only toward the cylinder 16, and an emergency shut-off valve 28. The compressed natural gas that fills the cylinder 16 is supplied to the engine, through a branch passage 30 formed halfway the first gas passage 22, and a pressure reducing valve or the like (not shown).

Figure 5A:
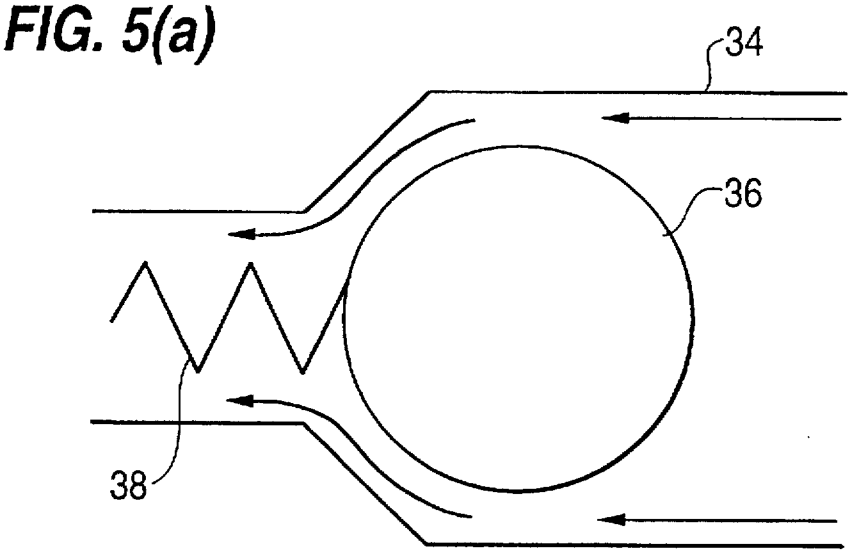
FIGS. 5(*a*) and 5(*b*) are views showing the function of an excess flow check valve, wherein FIG. 5(*a*) is a cross sectional view showing one state of the check valve in which the biasing force of a spring exceeds the force of fluid flow, and FIG. 5(*b*) is a cross sectional view showing another state in which the fluid flow force exceeds the spring force whereby the fluid flow is inhibited.
Figure 5B:
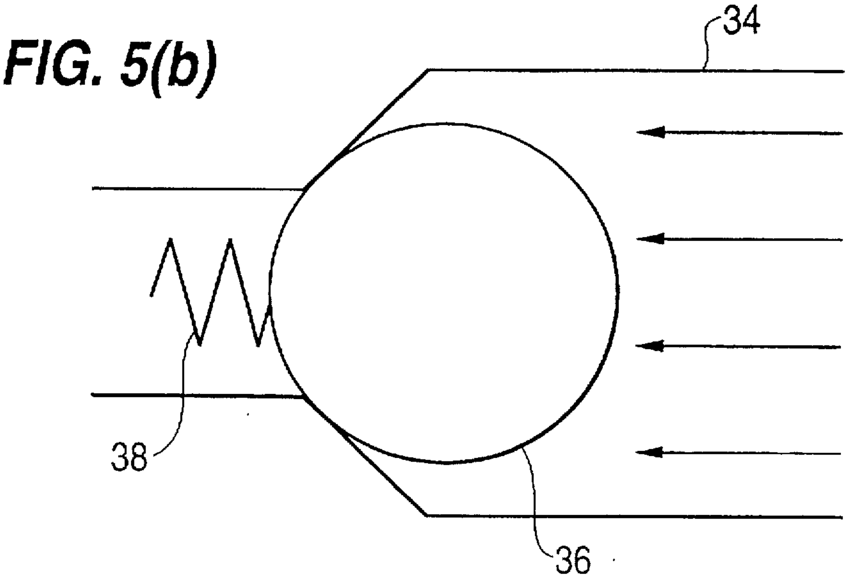

The second gas passage 24 is provided with an excess flow check valve 32 which is automatically placed in a closed state when the flow rate of the gas exceeds a predetermined value. As shown in FIG. 5, this excess flow check valve 32 consists principally of a passage 34 whose cross sectional area is reduced on the side of the second tank 18, a spherical valve body 36, and a spring 38. When the flow rate is equal to or smaller than the predetermined value, the biasing (returning) force of the spring 38 becomes equal to or greater than the force due to the flow of the fluid (gas), and allows the gas to pass through the valve 32. If the flow rate exceeds the predetermined value, the biasing force of the spring 38 becomes smaller than the force due to the flow of the fluid, whereby the fluid flow is shut off as shown in FIG. 5(*b*).

Figure 9A:
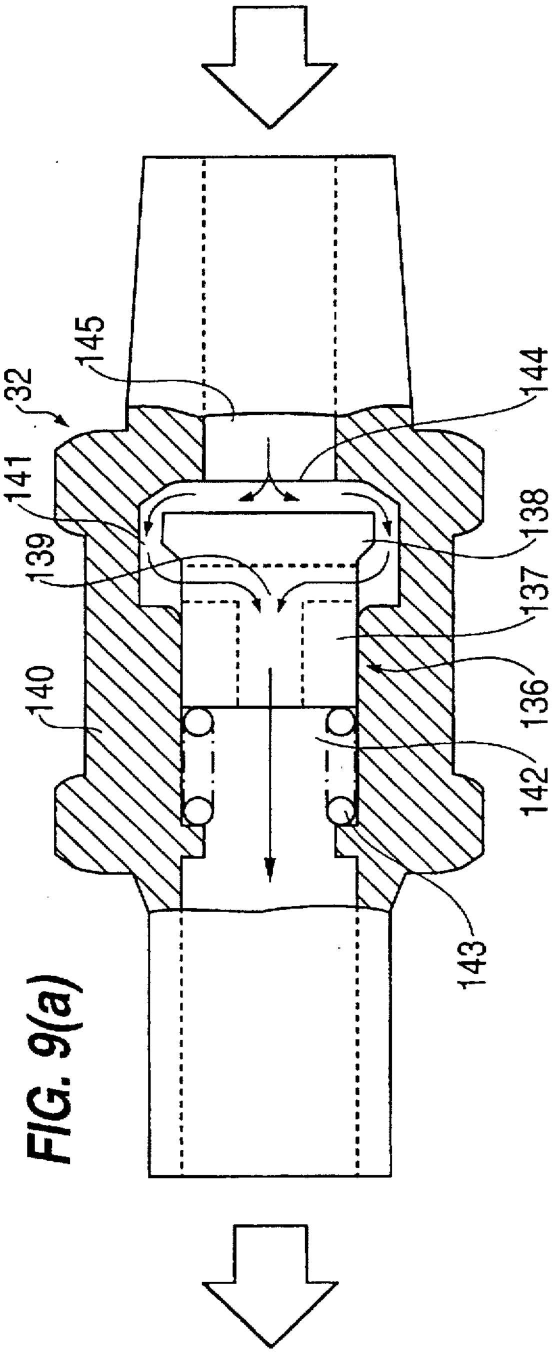
FIGS. 9(*a*) and 9(*b*) are views explaining the function of an actual excess flow check valve, wherein FIG. 9(*a*) is a cross sectional view showing one state of the check valve in which the biasing force of a spring exceeds the force of fluid flow, and FIG. 9(*b*) is a cross sectional view showing another state in which the fluid flow force exceeds the spring force whereby the fluid flow is inhibited.
Figure 9B:
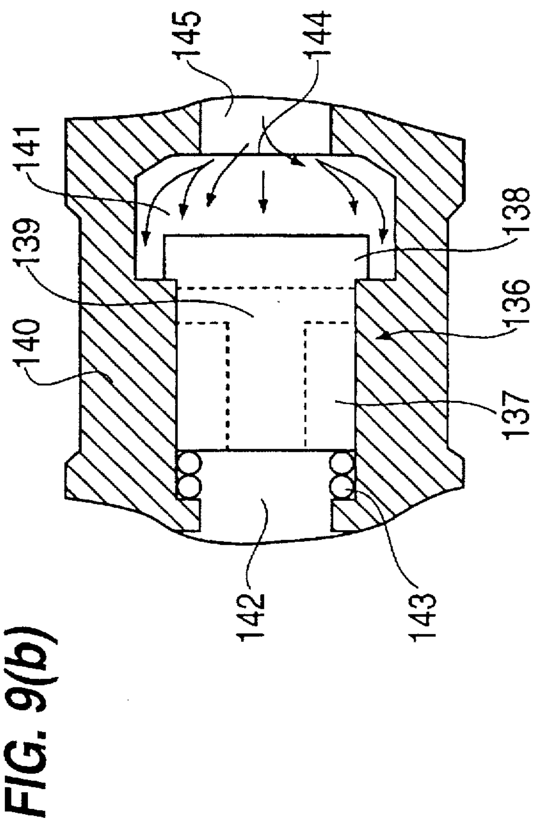

The excess flow check valve 32 will be described in greater detail by referring to FIGS. 9(*a*) and 9(*b*), which show an actual example. The excess flow check valve 32 consists of a poppet valve 136 corresponding to the spherical valve body 36, a cylinder body 140 and a spring 143. The poppet valve 136 is a generally cylindrical body as shown in the figures, and has a cylindrical portion 137, and a large-diameter end portion 138 formed on the upstream side (right-hand side in the figures) of the cylindrical portion 137.

The cylindrical portion 137 is formed with a passage 139 which is open on an outer peripheral surface of the portion 137, such that the passage 139 extends radially inwardly of the poppet valve 136, and further extends toward the downstream side (leftward in the figures) to be open on the downstream rear end face of the poppet valve 136. The poppet valve 136 is disposed in the cylinder body 140 as a part of the gas passage, which includes a large bore portion 141 having a larger diameter than the above-indicated large-diameter end portion 138, and a small bore portion 142 having a smaller diameter than the large-diameter end portion 138. The diameter of the small bore portion 142 is controlled to be substantially equal to that of the cylindrical portion 137, so that the poppet valve 136 is slidable within the cylinder body 140.

The poppet valve 136 is biased toward the upstream side by means of a spring 143. Reference numeral 145 denotes a passage formed on the upstream side of the excess flow check valve 32, and 144 denotes an upstream side opening of the excess flow check valve 32. The diameter of the upper stream side passage 145 is set to be smaller than that of the large-diameter end portion 138. When the flow rate of the fluid is zero, namely, there is no fluid pressure, the poppet valve 136 is biased by the spring 143 toward the upstream side, and abuts on an upstream side end wall of the large bore portion 141 of the cylinder body 140. At this time, the upstream side opening 144 is closed by the top surface of the poppet valve 136 (this state is not shown in the figures).

If the fluid starts flowing, the pressure is applied to the upstream side passage 145. The poppet valve 136 is pushed toward the downstream side due to the pressure of the fluid in the upstream side passage 145, as shown in FIG. 9(*a*). When the poppet valve 136 thus moves, the fluid flows into the large bore portion 141, and then into the passage 139 of the poppet valve 136 toward the downstream side.

If the pressure in the upstream side passage 145 is increased to be larger than a predetermined level, the biasing force of the spring 38 becomes smaller than the pressure of the fluid. The poppet valve 136 is, then, further pushed toward the downstream side due to the pressure of the fluid, until the large-diameter end portion 138 is completely pushed against a downstream side end wall of the large bore portion 141. As a result, the openings of the passage 139 located at the outer peripheral surface of the cylindrical portion 137 are located inside the small bore portion 142, whereby the openings are closed, and upstream and downstream passages are disconnected from each other to thereby inhibit the fluid to flow toward the downstream side.

There will be now described a gaseous fuel filling method using the structure constructed as shown in FIG. 1.

Initially, the fill couplers 6, 12 on the gas supply side and gas receiving side are connected to each other, as shown in FIG. 1, and the three way type valve 14 is switched from the "DRIVE" position that is selected during running of the vehicle 10, to the "REFUEL" position. The gas supply side fuel switch valve 8 is then opened so that the compressed natural gas, held at a predetermined pressure (200 $kgf/cm_2$), is supplied to the cylinder 16.

Figure 2:
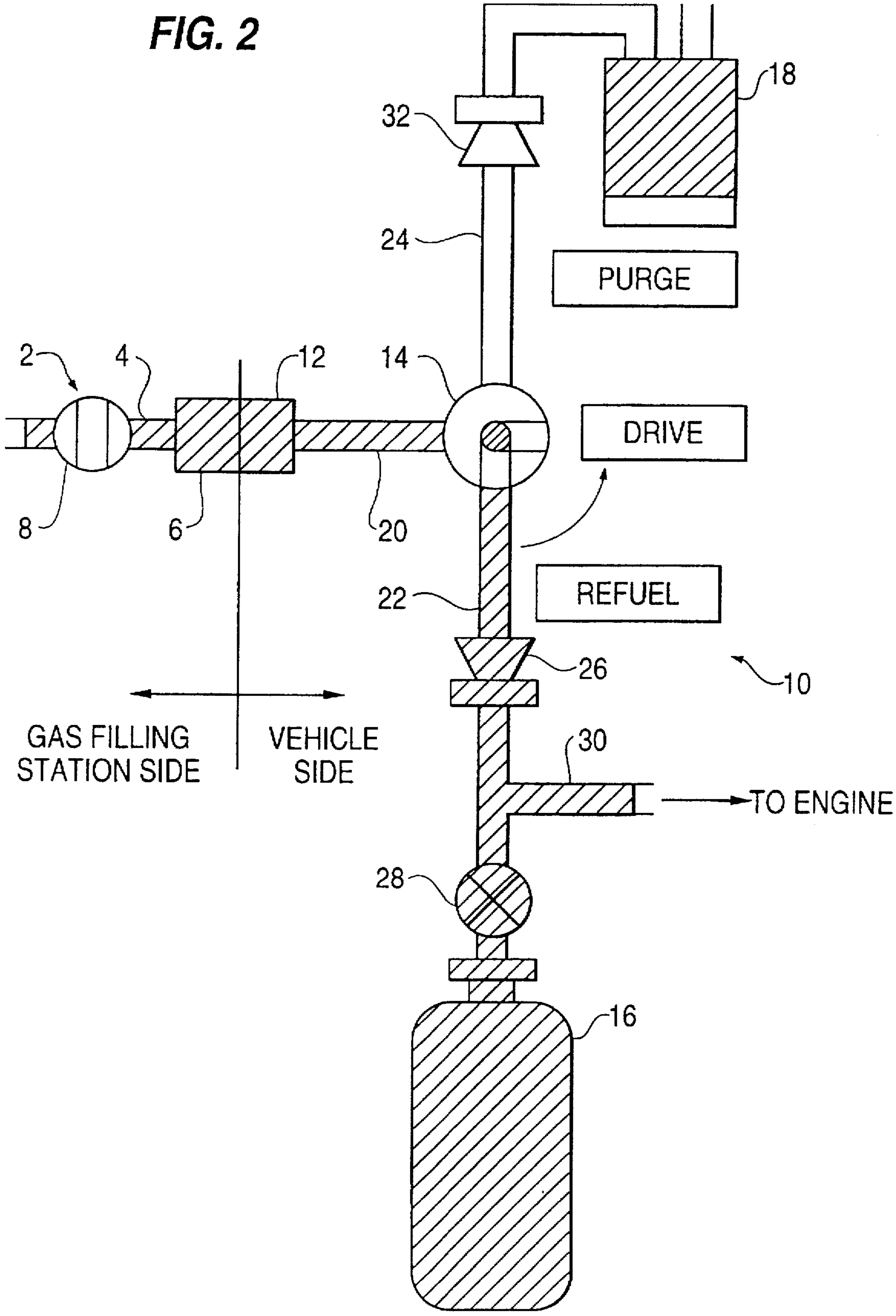
FIG. 2 is a view schematically showing an operating state of the structure of FIG. 1 in which a fuel cylinder is filled with the gas and a three way type valve is switched to a "DRIVE" position to reduce the filling pressure.

Once the cylinder 16 is filled with the natural gas, the three way type valve 14 is placed in the "DRIVE" position, as shown in FIG. 2, and the filling pressure of the gas supply system 2 is lowered to a pressure (e.g., 7 $kgf/cm^2$) that is approximately in equilibrium with the atmospheric pressure. The gas supply side switch valve 8 is then closed.

Figure 3:
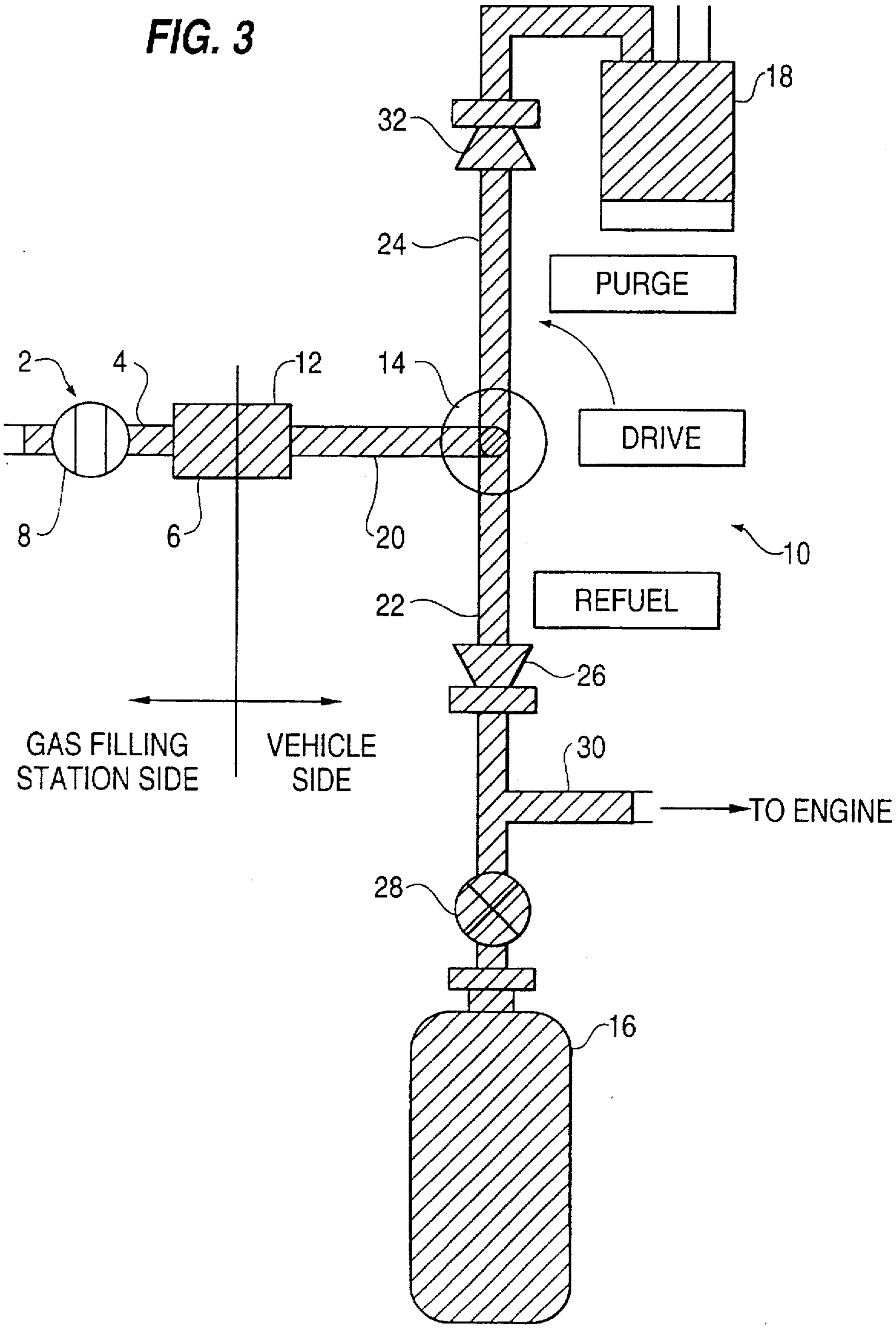
FIG. 3 is a view schematically showing another operating state of the structure of FIG. 1 in which the three way type valve is switched to a "PURGE" position so that remaining compressed natural gas is discharged into a second tank.

Subsequently, the three way type valve 14 is placed in the "PURGE" position, as shown in FIG. 3, so that the gas passage downstream of the gas supply side switch valve 8 is connected to the second tank 18, and the low-pressure compressed natural gas that remains downstream of the switch valve 8 is discharged into the second tank 18.

Figure 4:
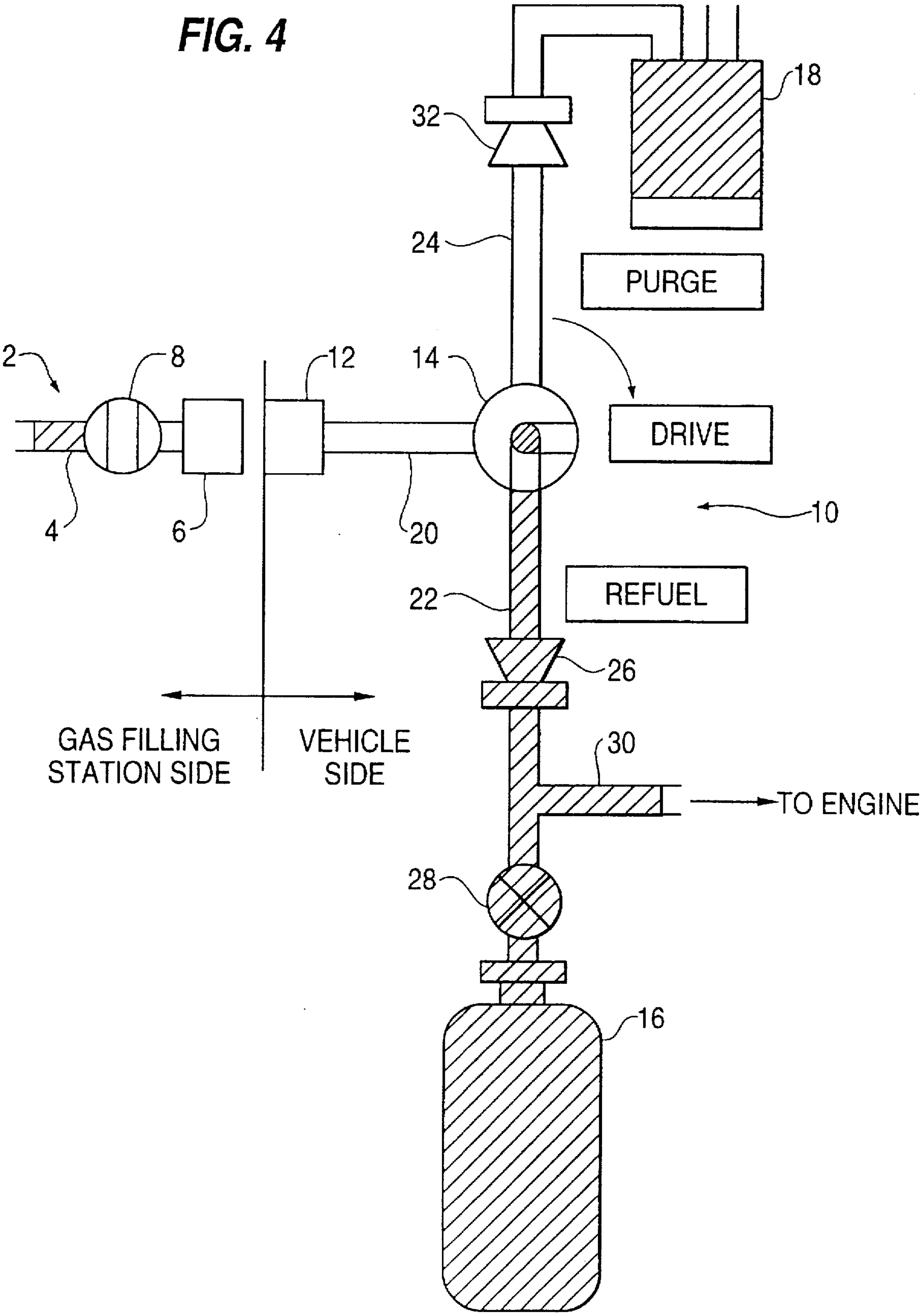
FIG. 4 is a view schematically showing a further operating state in which the three way type valve is returned to the "DRIVE" position and the filling coupler is disconnected from a gas supply system.

Thereafter, the three way type valve 14 is returned to the "DRIVE" position, as shown in FIG. 4, and the fill couplers 6, 12 are then disconnected from each other.

The fill couplers 6, 12 may be disconnected from each other with the three way type valve 14 placed in the "PURGE" position (FIG. 3) after the residual compressed natural gas is discharged into the second tank 18.

In the present embodiment shown in FIG. 1 and other figures, if the capacity of the second tank 18 (or gas adsorbing body 40 as described later) is originally set to be sufficiently large, the step of lowering the pressure in the gas supply system 2 to be close to the atmospheric pressure may be eliminated from the above-described procedure. In this case, after the gas supply side switch valve 8 is closed, the three way valve 14 is directly switched from the "REFUEL" position to the "PURGE" position, so that the gas in the gas passage is discharged into the second tank 18.

Further, if a restrictor (not shown) is provided in the second gas passage 24, a high-pressure fluid is prevented from flowing in a short period of time into the second tank 18, which is designed to accommodate a low-pressure fluid. This advantageously eliminates the possibility that the second tank 18 is damaged or broken.

Figure 6:
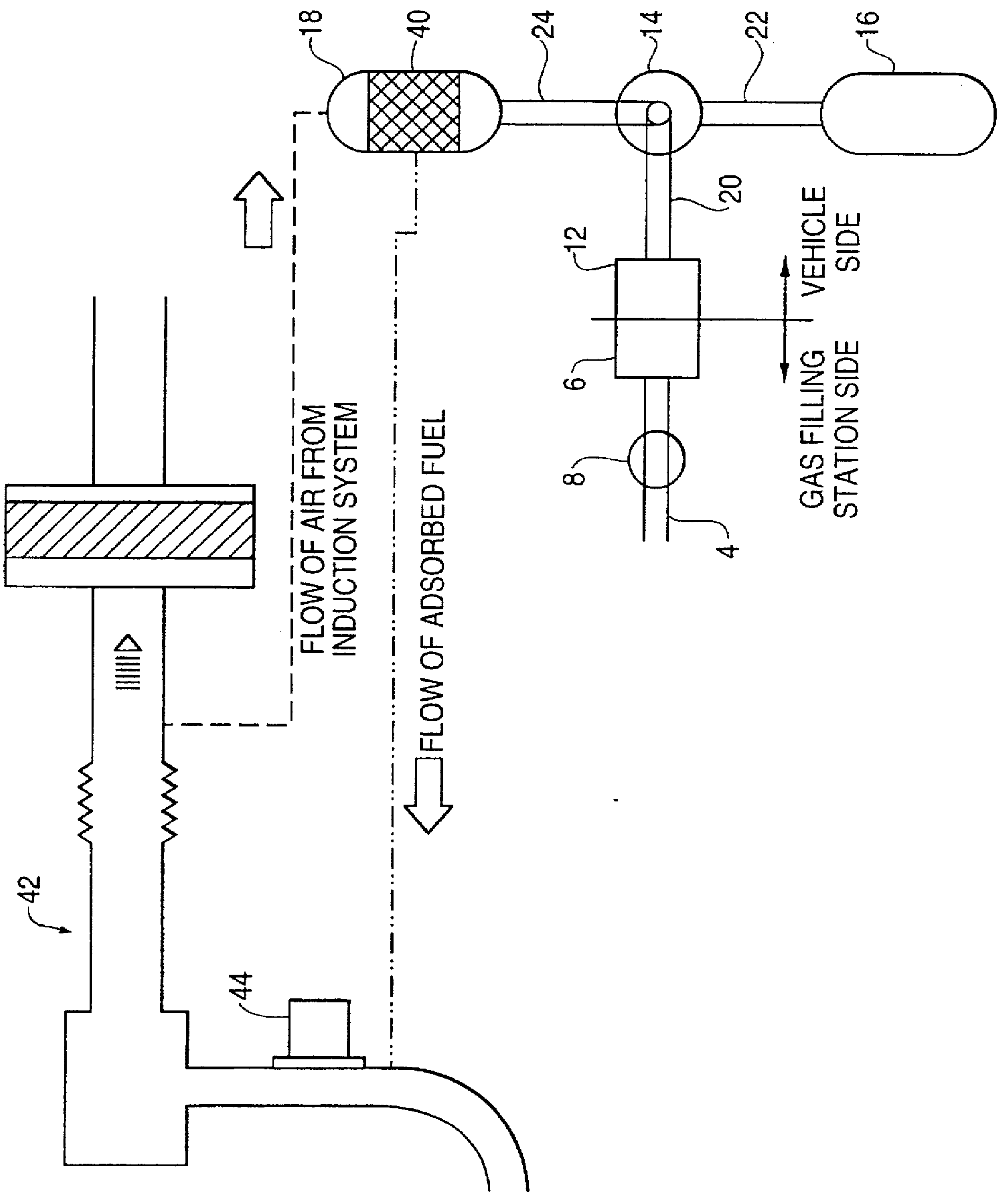
FIG. 6 is a schematic view showing connection between a second cylinder and an engine.

In the present embodiment, even if the three way valve 14 is erroneously operated or actuated such that the high-pressure fluid is supplied from the gas supply system 2 with the "PURGE" position selected, the excess flow check valve 32 serves to inhibit the high-pressure fluid from flowing into the second tank 18. The second tank 18 used in this embodiment serves not only to store the low-pressure residual compressed natural gas, but also to deliver the collected compressed natural gas to the engine of the vehicle 10, so that the natural gas delivered from the second tank 18 as well as that from the cylinder 16 is mixed with the air to provide an air/fuel mixture for use as a normal fuel in the engine. To this end, the second tank 18 is provided with a gas adsorbing body 40, and is held in communication with an induction system of the engine 42, as illustrated in FIG. 6.

More specifically, the air is introduced from the upstream side of a throttle valve 44 into the second tank 18, and the fuel adsorbed in the second tank 18 flows into the downstream side of the throttle valve 44. The pressure in the second tank 18 is controlled to be lower than that of the low-pressure compressed natural gas remaining between the gas supply side switch valve 8 and the three way type valve 14, and the residual low-pressure compressed natural gas is automatically sucked into the second tank 18 when the three way type valve 14 is placed in the "PURGE" position. Although the connection between the second tank 18 and the engine looks different between the structure shown in FIGS. 1–4 and that shown in FIG. 6, FIG. 6 merely shows a modified example for the purpose of making the connection easily understood, without changing the principle of the present invention.

In the structure of the present embodiment, the compressed natural gas remaining around a joint portion between the gas supply system 2 and the vehicle 10 is taken into the vehicle 10, and then the fill couplers 6 and 12 are disconnected from each other. This arrangement greatly contributes to control of the air pollution, since substantially no natural gas is dissipated at the gas filling station. Further, the residual compressed natural gas is adsorbed in the second tank 18 and delivered to an engine system for use as a fuel, thereby assuring an improved efficiency in the use of the fuel.

Moreover, a conventional CNG automobile can be readily equipped with the three way type valve 14, second tank 18 and others, to accomplish a function of preventing diffusion of the residual gas according to the principle of the present invention at a relatively low cost.

Figure 7:
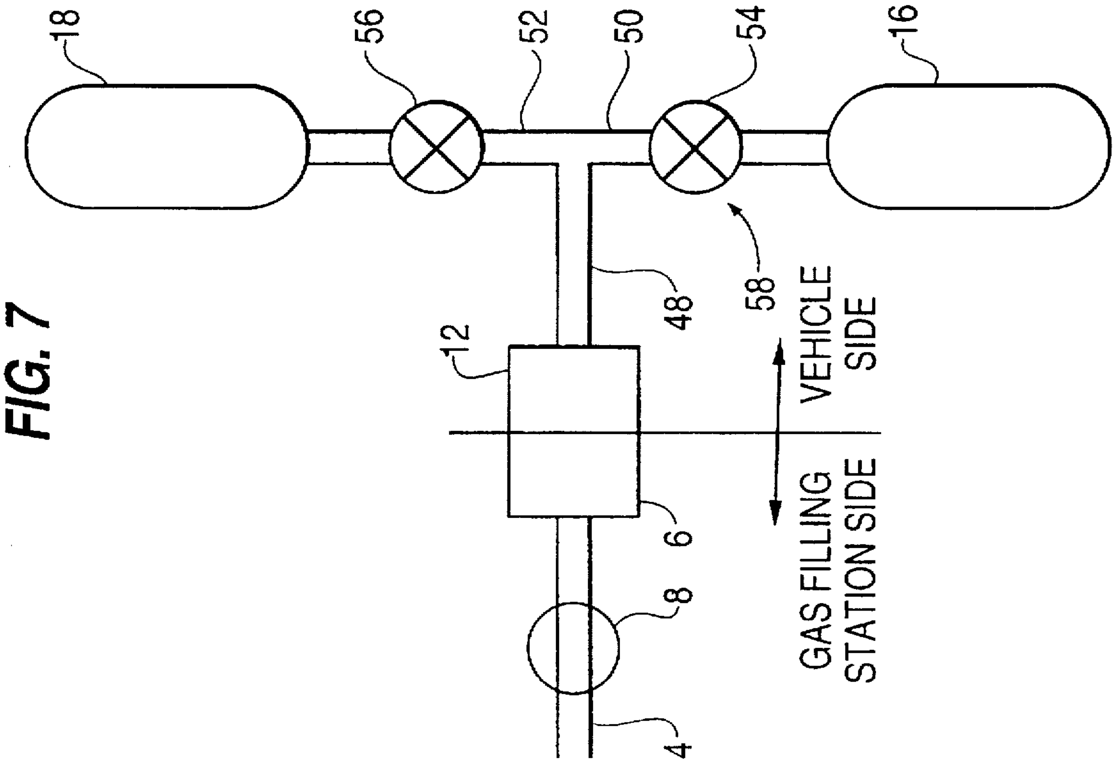
FIG. 7 is a view schematically showing a second embodiment of the present invention.

FIG. 7 shows a second embodiment of the present invention in which the structure on the vehicle side is different from that of the previous embodiment.

More specifically, this embodiment is different from the first embodiment in that the main passage 48 extending from the fill coupler 12 to the inside of the vehicle is split into a first gas passage 50 communicating with the cylinder 16 as the first tank, and a second gas passage 52 communicating with the second tank 18, and that switch valves 54, 56 provided in the first and second gas passages 50, 52, respectively, constitute a passage switching device 58. Namely, the function of the three way type valve 14 is performed by the individual switch valves 54, 56.

The passage switching device 58 is controlled by a computer or the like, so that the switch valves 54, 56 are placed in one of the following three states; a first state in which only the first gas passage 50 is closed, a second state in which only the second gas passage 52 is closed, and a third state in which both of the first and second gas passages 50, 52 are closed.

To refuel the vehicle, the fill couplers 6, 12 on both the gas supply and receiving sides are initially connected to each other, and the switch valve 54 is opened while the switch valve 56 is closed. In this condition, the gas supply side switch valve 8 is opened so that the compressed natural gas is supplied to the cylinder 16. Subsequently, after the switch valve 54 is closed, and the filling pressure of the gas supply system 2 is lowered, the gas supply side switch valve 8 is closed. The switch valve 56 is then opened so that the residual compressed natural gas flows into the second tank 18, and thereafter the fill couplers 6, 12 are disconnected from each other.

Figure 8:
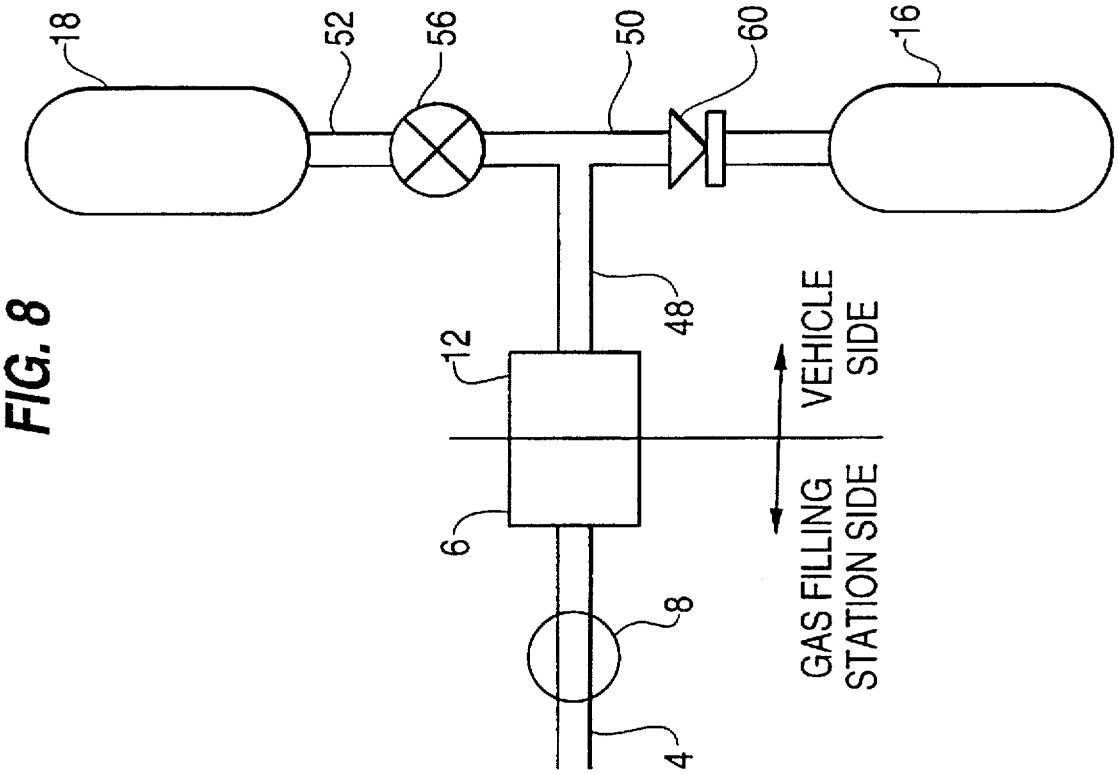
FIG. 8 is a view schematically showing a third embodiment of the invention.

FIG. 8 shows a third embodiment of the present invention in which the structure on the vehicle side is different from those of the illustrated embodiments.

More specifically, the present embodiment is different from the second embodiment of FIG. 7 in that the switch valve 54 provided in the first gas passage 50 is replaced by a check valve 60 that only allows the gas to flow toward the cylinder 16.

To refuel the vehicle, the fill couplers 6, 12 on both the gas supply and receiving sides are initially connected to each other, and the gas supply side switch valve 8 is opened with the switch valve 56 of the second gas passage 52 placed in the closed state, so that the compressed natural gas is supplied to the cylinder 16. After the filling pressure of the gas supply system 2 is lowered, the gas supply side switch valve 8 is closed. The switch valve 56 is then opened so that the residual compressed natural gas is discharged into the second tank 18, and thereafter the fill couplers 6 and 12 are disconnected from each other. The switch valve 56 may be closed after the residual compressed natural gas is discharged into the second tank 18, and the fill couplers 6 and 12 may be then disconnected from each other.

While the function of the second tank 18 and other elements is not mentioned in the above description of the second and third embodiments, the second tank 18 and other elements function in the same manner as those of the first embodiment to prevent diffusion of the residual gas in the same manner.

Figure 10:
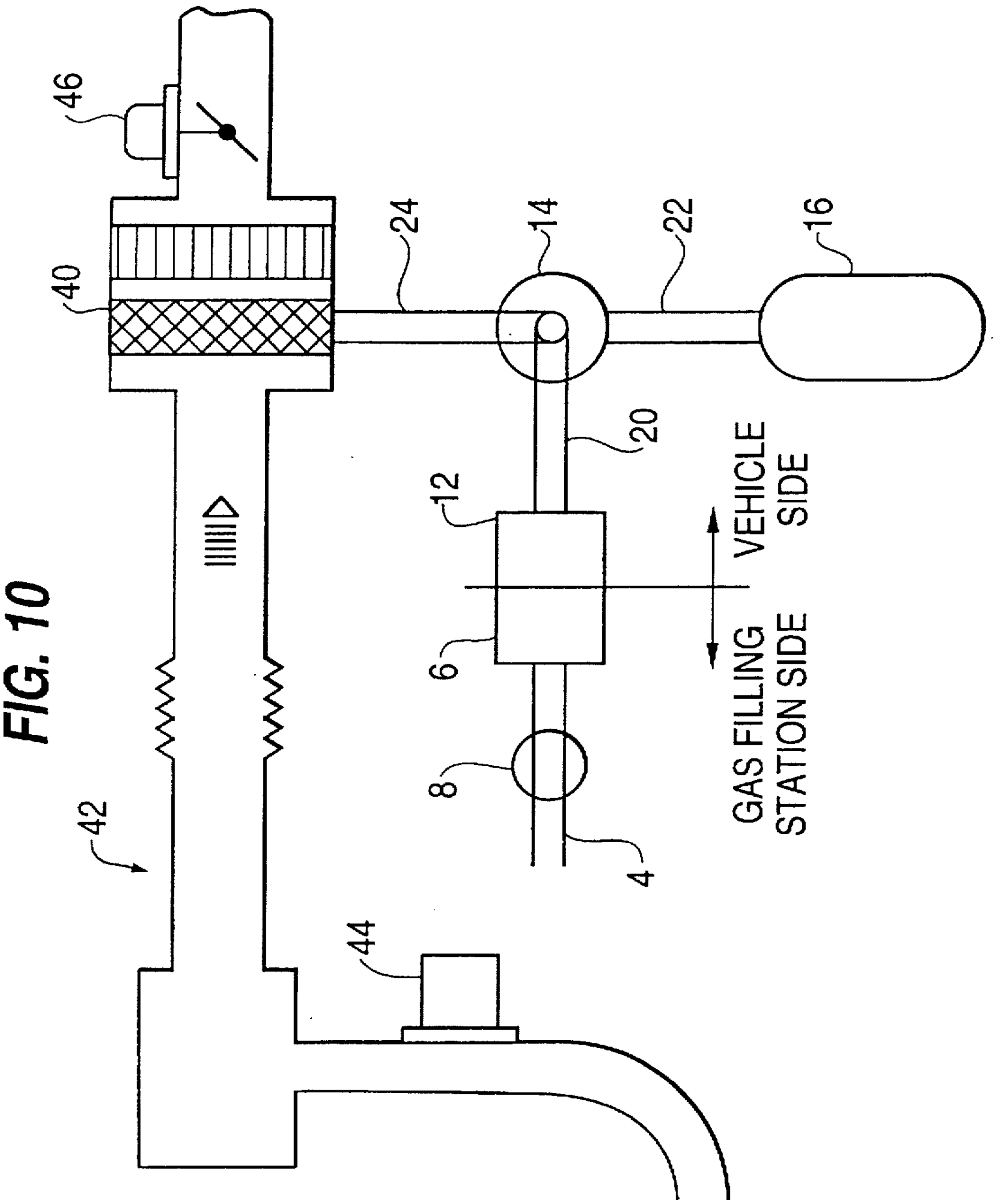
FIG. 10 is a view schematically showing a fourth embodiment of the present embodiment.
Figure 11:
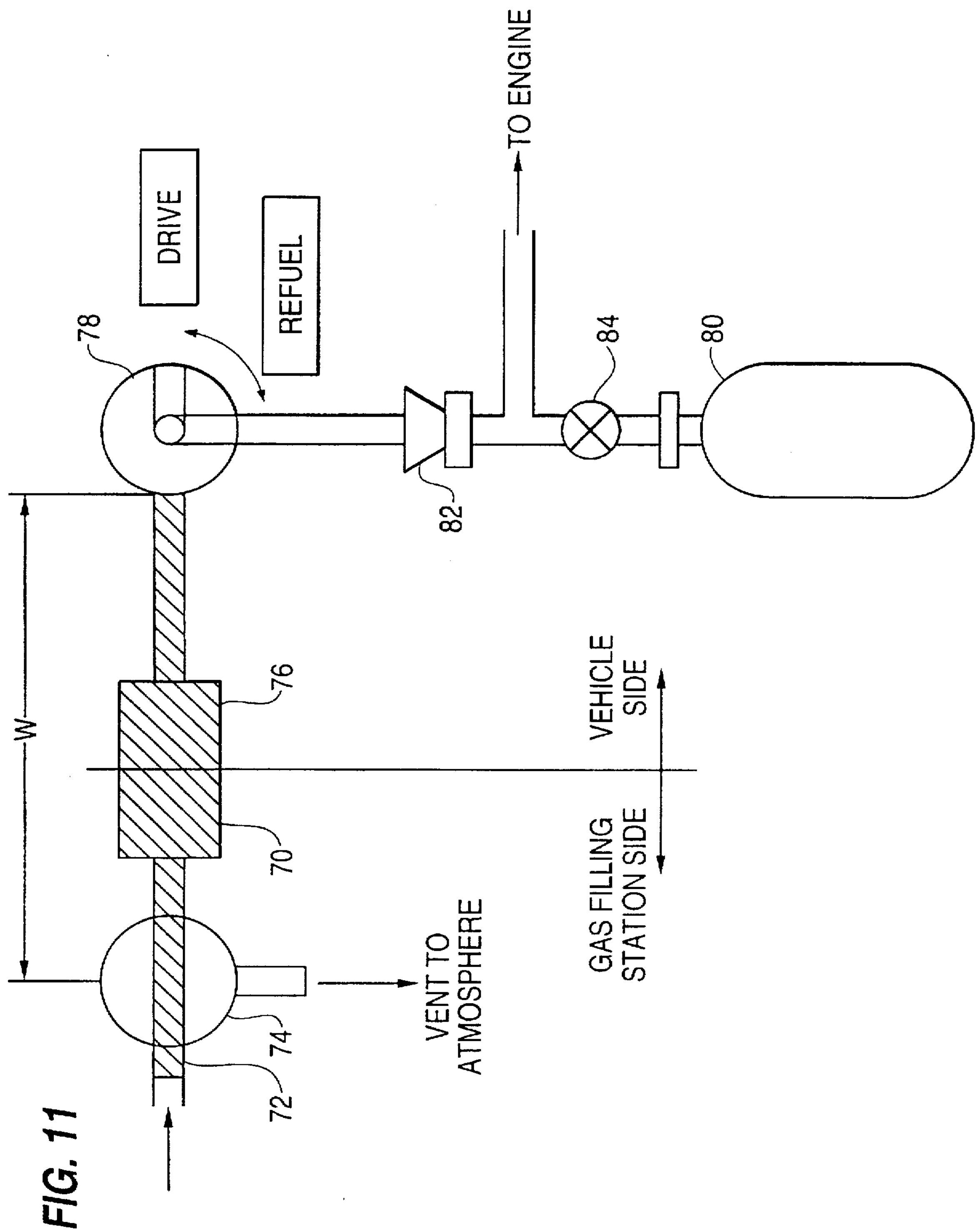
FIG. 11 is a schematic view showing a conventional example of gaseous fuel filling structure.

FIG. 10 shows a fourth embodiment of the present invention in which the structure on the vehicle side is different from those of the illustrated embodiments. More specifically, the present embodiment is different from the modified example of the first embodiment of FIG. 6 in that the adsorbing body 40 is directly mounted in the induction system of the engine 42. In this arrangement, the fuel adsorbed by the adsorbing body 40 is supplied to the engine due to flow of the intake air, and the adsorbing body 40 is thus reused. The fuel remaining in the induction system while the engine 44 is stopped is adsorbed by the adsorbing body 40, and thus prevented from diffusing into the air through an intake air inlet. Reference numeral 46 denotes an intake shutoff valve, which is closed while the engine is stopped so as to surely prevent the fuel remaining in the induction system from diffusing into the air through the intake air inlet.

Although the invention has been described in detail with respect to a preferred embodiment thereof, it will be apparent to those skilled in the art that various modifications are possible without departing from the scope of the present invention.

What is claimed is:

1. A gaseous fuel filling structure, comprising:
   - a coupler which connects to an external gaseous fuel supply system when supplying a gaseous fuel to a vehicle;
   - a gaseous fuel cylinder that stores the gaseous fuel supplied from the external gaseous supply system through said coupler;
   - a fuel dissipation preventing device which prevents dissipation of the gaseous fuel; and
   - a switching device placed in a selected one of a first state in which said coupler is connected to said gaseous fuel cylinder and disconnected from said fuel dissipation preventing device, and a second state in which said coupler is connected to said fuel dissipation preventing device, said switching device including a back flow preventing device which prevents back flow of the gaseous fuel from said gaseous fuel cylinder toward said coupler, wherein said gaseous fuel filling structure is provided on the vehicle.

2. A gaseous fuel filling structure according to claim 1, wherein a main passage extends from said coupler to said switching device, said main passage splitting into a first gas passage that communicates with said gaseous fuel cylinder, and a second gas passage that communicates with said fuel dissipation preventing means; and wherein said switching device comprises a valve device disposed at a position where said main passage splits into said first gas passage and said second gas passage, said valve device having a first switch position in which said main passage is connected to the first gas passage and disconnected from the second gas passage, a second switch position in which the main passage is connected to the second gas passage and disconnected from the first gas passage, and a third switch position in which the main passage is disconnected from both of the first and second gas passages.

3. A gaseous fuel filling structure according to claim 2, further comprising:

an excess flow check valve that is closed when a flow rate of the gaseous fuel in said second gas passage exceeds a predetermined value.

4. A gaseous fuel filling structure according to claim 2, wherein said fuel dissipation preventing device comprises a tank.

5. A gaseous fuel filling structure according to claim 2, wherein said fuel dissipation preventing device comprises an adsorbent that adsorbs the gaseous fuel.

6. A gaseous fuel filling structure according to claim 5, wherein said adsorbent is connected to an intake passage of an internal combustion engine that uses said gaseous fuel.

7. A gaseous fuel filling structure according to claim 5, wherein said adsorbent is provided in an intake passage of an internal combustion engine that uses said gaseous fuel.

8. A gaseous fuel filling structure according to claim 1, wherein a main passage extends from said coupler to said switching device, said main passage splitting into a first gas passage that communicates with said gas fuel cylinder, and a second gas passage that communicates with said fuel dissipation preventing device; and wherein said switching device comprises a first valve device disposed in said first gas passage to selectively open and close the first gas passage, and a second valve device disposed in said second gas passage to selectively open and close the second gas passage.

9. A gaseous fuel filling structure according to claim 8, further comprising:

an excess flow check valve that is closed when a flow rate of the gaseous fuel in said second gas passage exceeds a predetermined value.

10. A gaseous fuel filling structure according to claim 8, wherein said fuel dissipation preventing device comprises a tank.

11. A gaseous fuel filling structure according to claim 8, wherein said fuel dissipation preventing device comprises an adsorbent that adsorbs the gaseous fuel.

12. A gaseous fuel filling structure according to claim 11, wherein said adsorbent is connected to an intake passage of an internal combustion engine that uses said gaseous fuel.

13. A gaseous fuel filling structure according to claim 11, wherein said adsorbent is provided in an intake passage of an internal combustion engine that uses said gaseous fuel.

14. A gaseous fuel filling structure according to claim 1, wherein a main passage extends from said coupler to said switching device, said main passage splitting into a first gas passage that communicates with said gas fuel cylinder, and a second gas passage that communicates with said fuel dissipation preventing device; and wherein said switching device comprises a check valve disposed in said first gas passage to allow the gaseous fuel to flow only toward said gaseous fuel cylinder, and a valve device disposed in said second gas passage to selectively open and close the second gas passage.

15. A gaseous fuel filling structure according to claim 14, further comprising:

an excess flow check valve that is closed when a flow rate of the gaseous fuel in said second gas passage exceeds a predetermined value.

16. A gaseous fuel filling structure according to claim 14, wherein said fuel dissipation preventing device comprises a tank.

17. A gaseous fuel filling structure according to claim 14, wherein said fuel dissipation preventing device comprises an absorbent that absorbs the gaseous fuel.

18. A gaseous fuel filling structure according to claim 17, wherein said adsorbent is connected to an intake passage of an internal combustion engine that uses said gaseous fuel.

19. A gaseous fuel filling structure according to claim 17, wherein said adsorbent is provided in an intake passage of an internal combustion engine that uses said gaseous fuel.

20. A gaseous fuel filling structure according to claim 1, wherein said fuel dissipation preventing device comprises a tank.

21. A gaseous fuel filling structure according to claim 1, wherein said fuel dissipation preventing device comprises an adsorbent that adsorbs the gaseous fuel.

22. A gaseous fuel filling structure according to claim 21, wherein said adsorbent is connected to an intake passage of an internal combustion engine that uses said gaseous fuel.

23. A gaseous fuel filling structure according to claim 21, wherein said adsorbent is provided in an intake passage of an internal combustion engine that uses said gaseous fuel.

24. A gaseous fuel filling method, comprising:

providing, on a vehicle, a gaseous fuel filling structure including a vehicle-side coupler which connects to an external gaseous fuel supply system when supplying a gaseous fuel to a vehicle, a gaseous fuel cylinder that stores the gaseous fuel supplied from the external gaseous fuel supply system through said vehicle-side coupler, a fuel dissipation preventing device which prevents dissipation of the gaseous fuel, and a switching device placed in a selected one of a first state in which said vehicle-side coupler is connected to said gaseous fuel cylinder and disconnected from said fuel dissipation preventing device, and a second state in which said vehicle-side coupler is connected to said fuel dissipation preventing device, said switching device including a back flow preventing device which prevents back flow of the gaseous fuel from said gaseous fuel cylinder toward said vehicle-side coupler;

providing, independent of the vehicle, said external gaseous fuel supply system including, a filling coupler connected to said vehicle-side coupler when supplying the gaseous fuel to said gaseous fuel cylinder, a gas supply side switch valve disposed upstream of said filling coupler for selectively opening and closing a gas passage formed through the gaseous fuel supply system, and a supply pressure changing device which supplies the gaseous fuel under a high filling pressure during refueling and supplies the gaseous fuel under a low post-filling pressure upon completion of refueling;

connecting said filling coupler of the gaseous fuel supply system to said vehicle-side coupler of the gaseous fuel filling structure;

opening said gas supply side switch valve and placing said switching device in said first state in which said vehicle-side coupler is connected to said gaseous fuel cylinder and disconnected from said fuel dissipation preventing device so as to supply the gaseous fuel to the gaseous fuel cylinder under said high filling structure; and placing said switching device in said second state in which said vehicle-side coupler is connected to said fuel dissipation preventing device with said high filling pressure being reduced to said low post-filling pressure; and closing said gas supply side switch valve.

25. A gaseous fuel filling structure, comprising:

a coupler which connects to an external gaseous supply system when supplying a gaseous fuel to a fuel cylinder provided on a vehicle;

a fuel dissipation preventing device which provides dissipated gaseous fuel to an internal combustion engine of the vehicle;

a switching device placed in a selected one of a first state in which said coupler is connected to said fuel cylinder and disconnected from said fuel dissipation preventing device, and a second state in which said coupler is connected to said fuel dissipation preventing device, said switching device including a back flow preventing device which prevents back flow of the gaseous fuel from said gaseous fuel cylinder toward said coupler.

26. A gaseous fuel filling structure of claim 25, further comprising:

an adsorbent provided in said fuel dissipation preventing device.

27. A gaseous fuel filling structure of claim 25, wherein said fuel dissipation preventing device is an adsorbent provided in an intake system of the internal combustion engine.

* * * * *